US012609834B2

(12) United States Patent
Higashi

(10) Patent No.: US 12,609,834 B2
(45) Date of Patent: Apr. 21, 2026

(54) IMAGING APPARATUS, METHOD FOR CONTROLLING IMAGING APPARATUS, AND STORAGE MEDIUM

(71) Applicant: CANON KABUSHIKI KAISHA, Tokyo (JP)

(72) Inventor: Hidenori Higashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 76 days.

(21) Appl. No.: 18/634,748

(22) Filed: Apr. 12, 2024

(65) Prior Publication Data

US 2025/0219844 A1      Jul. 3, 2025

(30) Foreign Application Priority Data

Apr. 20, 2023    (JP) ................................. 2023-069115

(51) Int. Cl.
| | |
|---|---|
| *H04L 9/32* | (2006.01) |
| *G06F 21/64* | (2013.01) |
| *H04L 9/40* | (2022.01) |
| *H04N 7/18* | (2006.01) |
| *H04N 9/82* | (2006.01) |

(52) U.S. Cl.
CPC .......... *H04L 9/3247* (2013.01); *H04L 9/3239* (2013.01)

(58) Field of Classification Search
CPC . H04L 9/3247; H04L 9/3239; H04L 63/1425; H04L 63/123; H04N 7/18; H04N 9/8205; G06F 21/64
See application file for complete search history.

(56) References Cited

U.S. PATENT DOCUMENTS

| | | | |
|---|---|---|---|
| 2003/0028298 A1 | 2/2003 | Macky | |
| 2007/0162756 A1* | 7/2007 | Fredlund | H04L 63/0823 |
| | | | 713/176 |
| 2010/0146287 A1* | 6/2010 | Kreiner | H04L 63/12 |
| | | | 713/176 |
| 2011/0078459 A1* | 3/2011 | Yoshioka | H04L 9/3247 |
| | | | 713/189 |
| 2011/0149078 A1* | 6/2011 | Fan | H04N 23/661 |
| | | | 348/E5.042 |
| 2013/0271602 A1* | 10/2013 | Bentley | G06T 7/215 |
| | | | 348/143 |
| 2014/0376876 A1* | 12/2014 | Bentley | G06V 40/23 |
| | | | 386/227 |
| 2015/0154452 A1* | 6/2015 | Bentley | G11B 27/022 |
| | | | 386/201 |
| 2016/0292509 A1* | 10/2016 | Kaps | G06V 40/23 |
| 2016/0335861 A1* | 11/2016 | Shimura | H04N 7/188 |

(Continued)

FOREIGN PATENT DOCUMENTS

| | | |
|---|---|---|
| EP | 4109437 A1 | 12/2022 |
| JP | 2010245590 A | 10/2010 |

(Continued)

*Primary Examiner* — Darren B Schwartz

(74) *Attorney, Agent, or Firm* — Canon U.S.A., Inc. IP DIvision

(57) ABSTRACT

An acquisition unit acquires a video captured by an imaging unit frame by frame. A generation unit generates a digital signature for the frame of the video where a predetermined event related to an imaging apparatus or the video occurs. In a case where the predetermined event is determined as being ended, the generation unit ends the generation of the digital signature for the frame of the video.

14 Claims, 5 Drawing Sheets

(56) References Cited

U.S. PATENT DOCUMENTS

| | | | |
|---|---|---|---|
| 2017/0094226 A1* | 3/2017 | Guzik .................... | H04L 67/06 |
| 2020/0252577 A1* | 8/2020 | Teruuchi ............... | G11B 27/34 |
| 2022/0301368 A1* | 9/2022 | Taniyama ............. | H04N 23/65 |
| 2022/0368534 A1* | 11/2022 | Lundberg ............. | H04L 9/3239 |
| 2024/0259580 A1* | 8/2024 | Völcker ............. | H04L 63/0442 |

FOREIGN PATENT DOCUMENTS

| | | | |
|---|---|---|---|
| JP | 2017041841 A | 2/2017 |
| JP | 2017169183 A | 9/2017 |
| JP | 2019205140 A | 11/2019 |
| JP | 2021166381 A | 10/2021 |

* cited by examiner

FIG. 3

| | DASHBOARD CAMERA | WEARABLE CAMERA | NETWORK CAMERA |
|---|---|---|---|
| MOTION DETECTION | x | x | VALID TRIGGER |
| SPECIFIC INDIVIDUAL SPECIFIC OBJECT | x | VALID TRIGGER | VALID TRIGGER |
| ACCELERATION EQUAL TO OR ABOVE THRESHOLD | VALID TRIGGER | VALID TRIGGER | x |
| SPECIFIC SOUND | x | VALID TRIGGER | VALID TRIGGER |

301
302
303
304

IMAGING APPARATUS, METHOD FOR CONTROLLING IMAGING APPARATUS, AND STORAGE MEDIUM

BACKGROUND OF THE INVENTION

Field of the Invention

The present disclosure relates to an imaging apparatus, a method for controlling the imaging apparatus, and a storage medium.

Description of the Related Art

It has become easy to edit or tamper images using a smartphone or a personal computer. The finish is so natural that it is difficult for the human eye to determine whether the image has been edited or tampered with. This increases the importance of technically ensuring that an image captured by a reliable camera with guaranteed security has not been edited or tampered with after the image capturing in use cases and scenes where evidentiality for the image is required.

Further, in a case where an editing/tampering detection functionality is added to an image captured by a camera and stored, it is difficult to eliminate the possibility that the image is edited or tampered with before the editing/tampering detection functionality is added after the image is stored. In this case, it is not possible to technically demonstrate that the image has not been edited or tampered with after being captured by the camera. Thus, it is extremely important to add the editing/tampering detection functionality to the image in the camera during the capturing by the camera.

Considering the foregoing background, technologies for providing evidentiality to an image in a camera are known. Further, Japanese Patent Application Laid-Open No. 2017-41841 discusses a technology for generating a digital signature for an image in a camera and transmitting the image and the digital signature together. Further, Japanese Patent Application Laid-Open No. 2010-245590 discusses a technology for generating a signature for a plurality of frames collectively based on the usage of a central processing unit (CPU) of a signature generation apparatus, memory usage, and frequency of video data transmission to the signature generation apparatus.

Examples of cameras that may be used in use cases or scenes where the evidentiality of an image is questioned are monitoring cameras, dashboard cameras, and wearable cameras. Even with the cameras, however, evidentiality is required only for images that capture an emergency in many cases, and evidentiality is normally not required for most captured images.

SUMMARY OF THE INVENTION

According to an aspect of the present invention, an imaging apparatus includes an acquisition unit configured to acquire a video captured by an imaging unit frame by frame and a generation unit configured to generate a digital signature for a frame of the video and generate no digital signature for another frame of the video in a case where a predetermined detection related to the imaging apparatus or the video occurs.

Further features of the present invention will become apparent from the following description of exemplary embodiments with reference to the attached drawings.

BRIEF DESCRIPTION OF THE DRAWINGS

FIG. 3 is a diagram illustrating an example of combinations of camera types and specific triggers.

DESCRIPTION OF THE EMBODIMENTS

Exemplary embodiments will be described in detail below with reference to the drawings.

With the above-described technologies discussed in Japanese Patent Application Laid-Open Nos. 2017-41841 and 2010-245590, a digital signature is generated for every captured image, and this increases the processing load of the camera. Specifically, generating a digital signature even for images that do not need evidentiality can lead to increased power consumption and unnecessary heat generation. Furthermore, the technology discussed in Japanese Patent Application Laid-Open No. 2010-245590 is not capable of ensuring that an image is not tampered with at the time of generating a signature, so that it is not possible to ensure that the image has not been edited or tampered with after being captured by the camera.

Each exemplary embodiment described below makes it possible to reduce processing load in generating a digital signature.

Figure 1:
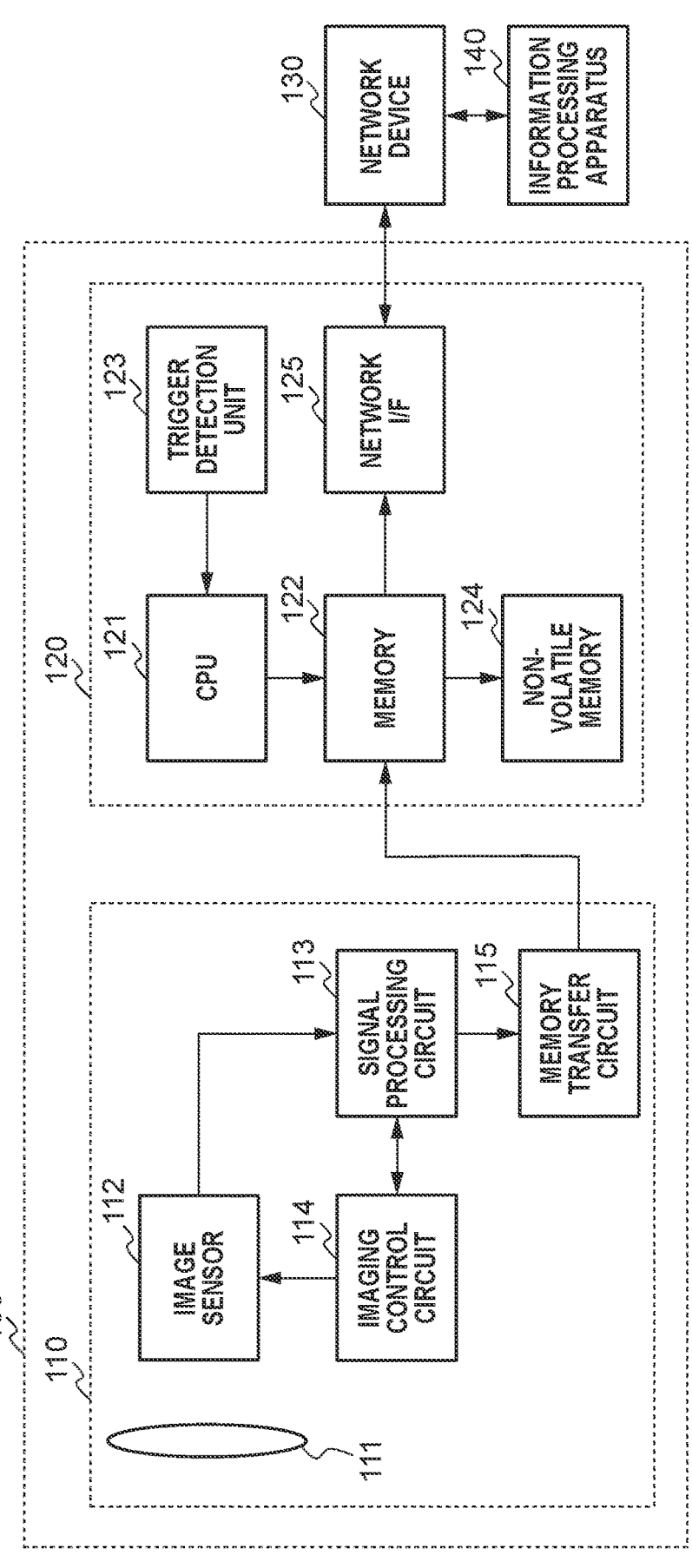
FIG. 1 is a block diagram illustrating an example of a configuration of a camera.

FIG. 1 is a block diagram illustrating an example of a configuration of a camera 100 according to a first exemplary embodiment. The camera 100 according to the present exemplary embodiment will be described below with reference to FIG. 1.

The camera 100 includes an imaging unit 110 and a controller unit 120 and is connected to an information processing apparatus 140 via a network device 130. The camera 100 transfers images from the imaging unit 110 to the controller unit 120, stores the images in a non-volatile memory 124, and distributes the images to the information processing apparatus 140 via a network.

The imaging unit 110 of the camera 100 includes an optical lens 111, an image sensor 112, a signal processing circuit 113, an imaging control circuit 114, and a memory transfer circuit 115. The image sensor 112 converts light focused through the optical lens 111 into charges and generates imaging signals. The imaging signals generated by the image sensor 112 are input to the signal processing circuit 113, and the signal processing circuit 113 digitalizes the input signals and generates captured images.

The imaging control circuit 114 controls the image sensor 112 at the same cycle as an image output cycle. Further, in a case where a charge accumulation time is longer than the image output cycle, the imaging control circuit 114 controls the signal processing circuit 113 to hold captured images in a frame memory of the signal processing circuit 113 during a period without output of imaging signals from the image sensor 112.

The memory transfer circuit 115 transfers captured images generated by the signal processing circuit 113 to a memory 122 in the controller unit 120.

The controller unit 120 of the camera 100 includes a central processing unit (CPU) 121, the memory 122, a trigger detection unit 123, the non-volatile memory 124, and a network interface (network I/F) 125. The trigger detection unit 123 detects a trigger indicating an input from a sensor device (not illustrated), a trigger indicating a detection of a specific sound, and a trigger indicating a detection of a specific change in a captured image.

The CPU 121 calculates a hash value for image data on the memory 122 and generates a digital signature using a secret key (not illustrated) of the camera 100. While the hash value calculation and the digital signature generation are described as being executed by the CPU 121, this description is not intended to limit configurations, and the hash value calculation and the digital signature generation may be executed by a module other than the CPU 121.

The network device 130 enables communication between the camera 100 and the information processing apparatus 140 via the network I/F 125. An example of the network device 130 is a switching hub, and examples of the information processing apparatus 140 are a personal computer and a computer device that store images.

Figure 2:
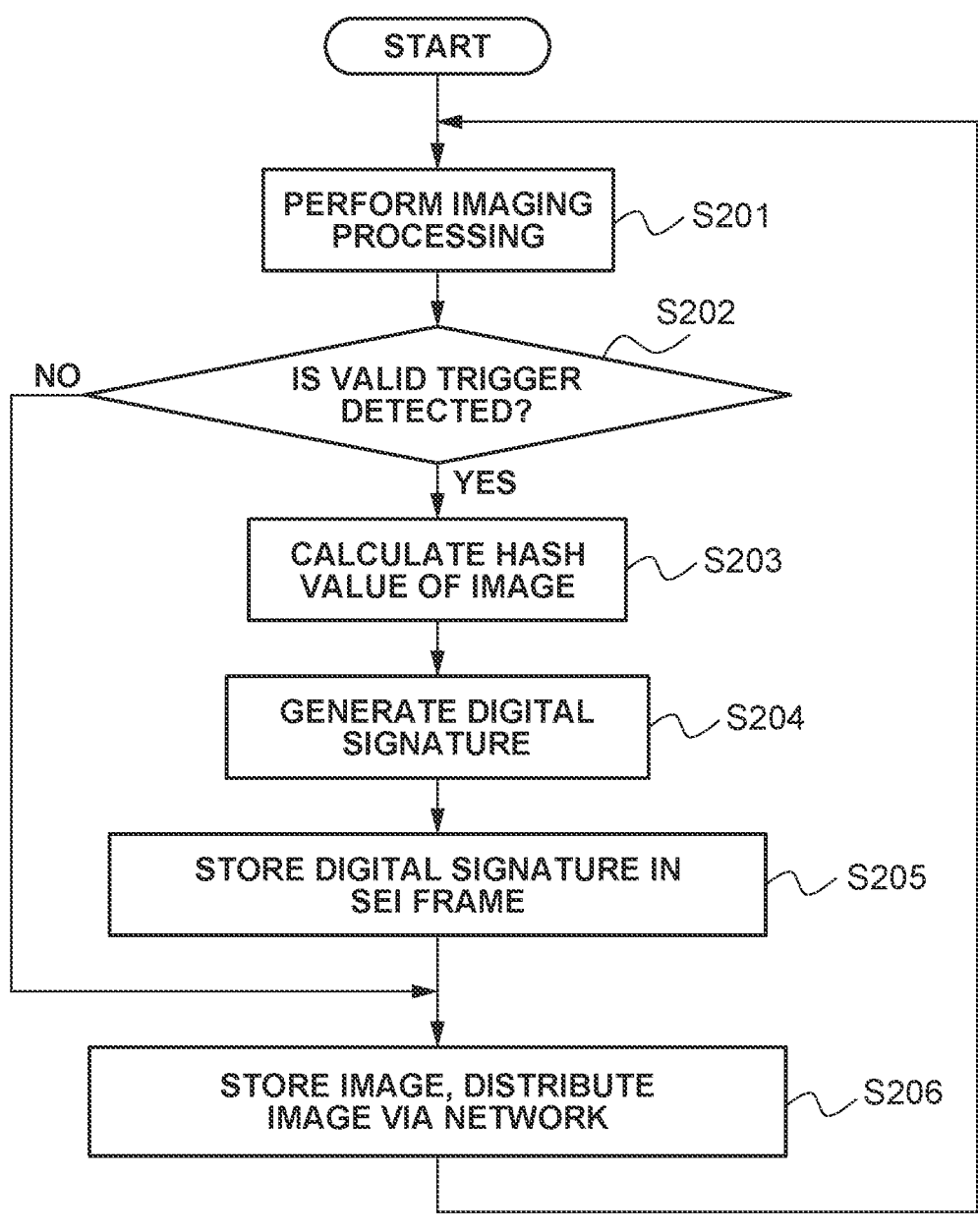
FIG. 2 is a flowchart illustrating a camera control method.

FIG. 2 is a flowchart illustrating a method for controlling the camera 100 according to the first exemplary embodiment and illustrates details of a process of generating a digital signature for use to detect editing and tampering of an image in the camera 100 in a case where a specific trigger (detection) occurs. FIG. 3 is a diagram illustrating examples of specific triggers for each type of the camera 100. The first exemplary embodiment will be described below with reference to FIGS. 2 and 3.

In a case where the camera 100 is powered on and imaging is started, the process in the flowchart in FIG. 2 starts. In step S201, the imaging unit 110 performs imaging processing. Specifically, the image sensor 112 converts light focused through the optical lens 111 into charges and generates an imaging signal. The imaging signal generated by the image sensor 112 is input to the signal processing circuit 113, and the signal processing circuit 113 digitalizes the input signal and generates a captured image. The memory transfer circuit 115 sequentially transfers the captured image generated by the signal processing circuit 113 frame by frame to the memory 122 in the controller unit 120. The memory 122 stores the captured image frame by frame. The captured image is a video including a plurality of frames. The CPU 121 functions as an acquisition unit and acquires the video captured by the imaging unit 110 frame by frame via the memory 122.

In step S202, the CPU 121 determines whether a valid trigger is detected by the trigger detection unit 123. For example, in a case where the trigger detection unit 123 detects a specific sound, the CPU 121 determines that a valid trigger is detected by the trigger detection unit 123, as illustrated in FIG. 3.

A valid trigger is a trigger for detecting that a captured image has been edited or tampered with. Details of valid triggers will be described below with reference to FIG. 3.

In a case where a valid trigger is detected by the trigger detection unit 123 (YES in step S202), the processing proceeds to step S203, whereas in a case where no valid trigger is detected by the trigger detection unit 123 (NO in step S202), the processing proceeds to step S206.

In step S206, in a case where the camera 100 is, for example, a dashboard camera or a wearable camera, the CPU 121 stores the captured image transferred to the memory 122 in a memory such as a memory card. In a case where the camera 100 is a network camera, the CPU 121 distributes the captured image transferred to the memory 122 to the information processing apparatus 140 via the network I/F 125 and the network device 130. Thereafter, the processing returns to step S201, and the CPU 121 repeats the process on the next frame.

In step S203, the CPU 121 calculates a hash value for the captured image transferred to the memory 122. This hash value calculation may be performed, for example, for each group of pictures (GOP) or for each frame.

Next, in step S204, the CPU 121 encrypts the hash value calculated in step S203 with the secret key stored in the camera 100 and generates a digital signature.

Next, in step S205, the CPU 121 stores the digital signature generated in step S204 in a Supplemental Enhancement Information (SEI) frame of the captured image that is supported by, for example, H.264 or H.265. Thereafter, the processing proceeds to step S206.

In step S206, in a case where the camera 100 is, for example, a dashboard camera or a wearable camera, the CPU 121 stores the captured image for which the digital signature is stored in the SEI frame in a memory such as a memory card. In a case where the camera 100 is a network camera, the CPU 121 distributes the captured image for which the digital signature is stored in the SEI frame to the information processing apparatus 140 via the network I/F 125 and the network device 130. Thereafter, the processing returns to step S201, and the CPU 121 repeats the process on the next frame.

FIG. 3 is a diagram illustrating specific examples of valid triggers (detection) 301 to 304 for detecting that the captured image has been edited or tampered with in step S202. Examples of the valid triggers 301 to 304 for cases where the camera 100 is a dashboard camera, a wearable camera, or a network camera are illustrated. Since a case where evidentiality needs to be provided to a captured image is often not a normal situation but an emergency, the valid triggers 301 to 304 are desirably triggers for emergency cases.

For example, the trigger 301 is a trigger for cases where a motion is detected by the trigger detection unit 123 of the camera 100. In a case where the camera 100 is a dashboard camera or a wearable camera, the camera 100 itself is moving in many cases, so that the trigger detection unit 123 detects a motion even in a normal situation. Thus, the CPU 121 determines that the trigger 301 is not a valid trigger.

On the other hand, in a case where the camera 100 is a network camera that images a space normally without a person, a case where a motion is detected by the trigger detection unit 123 should be determined as an emergency. Thus, the CPU 121 determines that the trigger 301 is a valid trigger.

However, in a case where the camera 100 is a network camera that images scenes in which it is normal to detect a motion, such as a live monitoring camera at an intersection, a case where a motion is detected by the trigger detection unit 123 is a normal situation. In this case, the CPU 121 determines that the trigger 301 is not a valid trigger. Thus, the CPU 121 may determine whether to determine the trigger 301 for motion detection as a valid trigger for each use case of the network camera.

Next, the trigger 302 will be described below. The trigger 302 is a trigger for cases where a specific individual or a specific object is detected by the trigger detection unit 123 of the camera 100. In a case where the camera 100 is a wearable camera of a police officer or a security guard or is a network camera used for monitoring, the CPU 121 should determine the trigger 302 as an emergency. Thus, the CPU 121 determines that the trigger 302 is a valid trigger.

On the other hand, in a case where the camera 100 is a dashboard camera, it is unlikely that the camera 100 is used to detect a specific individual or a specific object. Thus, the CPU 121 determines that the trigger 302 is not a valid trigger.

Next, the trigger 303 will be described below. The trigger 303 is a trigger for cases where an acceleration equal to or above a threshold is detected by the trigger detection unit 123 of the camera 100. In a case where the camera 100 is a dashboard camera, the trigger 303 should be determined as an emergency because sudden braking or collision is likely to have occurred. Thus, the CPU 121 determines that the trigger 303 is a valid trigger.

Further, in a case where the camera 100 is a wearable camera of a police officer or a security guard, the trigger 303 should be determined as an emergency because the possessor of the camera 100 is likely to have started running to pursue. Thus, the CPU 121 determines that the trigger 303 is a valid trigger.

On the other hand, in a case where the camera 100 is a network camera, the camera 100 is often fixed, so that it is unlikely that the trigger detection unit 123 detects an acceleration equal to or above the threshold, and the camera 100 is unlikely to be equipped with an acceleration sensor. Thus, the CPU 121 determines that the trigger 303 is not a valid trigger.

Next, the trigger 304 will be described below. The trigger 304 is a trigger for cases where a specific sound such as a scream, a gunshot sound, or a glass sound is detected by the trigger detection unit 123 of the camera 100. In a case where the camera 100 is a wearable camera of a police officer or a security guard or is a network camera used for monitoring, the trigger 304 should be determined as an emergency. Thus, the CPU 121 determines that the trigger 304 is a valid trigger.

On the other hand, in a case where the camera 100 is a dashboard camera, it is unlikely that the camera 100 is used to detect a specific sound such as a scream, a gunshot sound, or a glass sound. Thus, the CPU 121 determines that the trigger 304 is not a valid trigger.

As described above, in step S202, the CPU 121 functions as a determination unit and determines, for each frame of the video, whether a predetermined detection occurs. The predetermined detection is an occurrence of a predetermined detection related to the camera 100 or the video. In steps S203 and S204, the CPU 121 calculates a hash value and generates a digital signature for a frame or GOP corresponding to the frame where the predetermined detection occurs.

In step S204, the CPU 121 functions as a generation unit and generates a digital signature for a frame of the video but does not generate a digital signature for another frame of the video. Specifically, in step S203, the CPU 121 functions as a calculation unit and calculates a hash value for a frame of the video but does not calculate a hash value for another frame of the video. In step S204, the CPU 121 generates a digital signature by encrypting the hash value calculated in step S203.

In step S206, the captured image for which the digital signature is stored in the SEI frame is stored or distributed. An acquirer of the captured image can verify whether the captured image has been edited or tampered with using the digital signature. A case where the information processing apparatus 140 receives the captured image will be described below as an example. First, the information processing apparatus 140 decrypts the received digital signature with a public key and acquires a hash value. Next, the information processing apparatus 140 calculates a hash value for the received captured image. Next, the information processing apparatus 140 determines whether the decrypted hash value and the calculated hash value are the same. In a case where the hash values are the same, this indicates that the received captured image has not been edited or tampered with. In a case where the hash values are not the same, this indicates that the captured image has been edited or tampered with.

As described above, according to the present exemplary embodiment, the camera 100 generates a digital signature for captured images for which evidentiality is needed. For example, in a case where a captured image for which a digital signature has been generated has been edited or tampered with, the information processing apparatus 140 detects the editing or tampering. Since the camera 100 generates a digital signature only for frames of scenes for which evidentiality is required, processing loads such as hash value calculation costs related to the digital signature generation process and memory usage are reduced compared to a case where a digital signature is generated for every frame.

Figure 4:
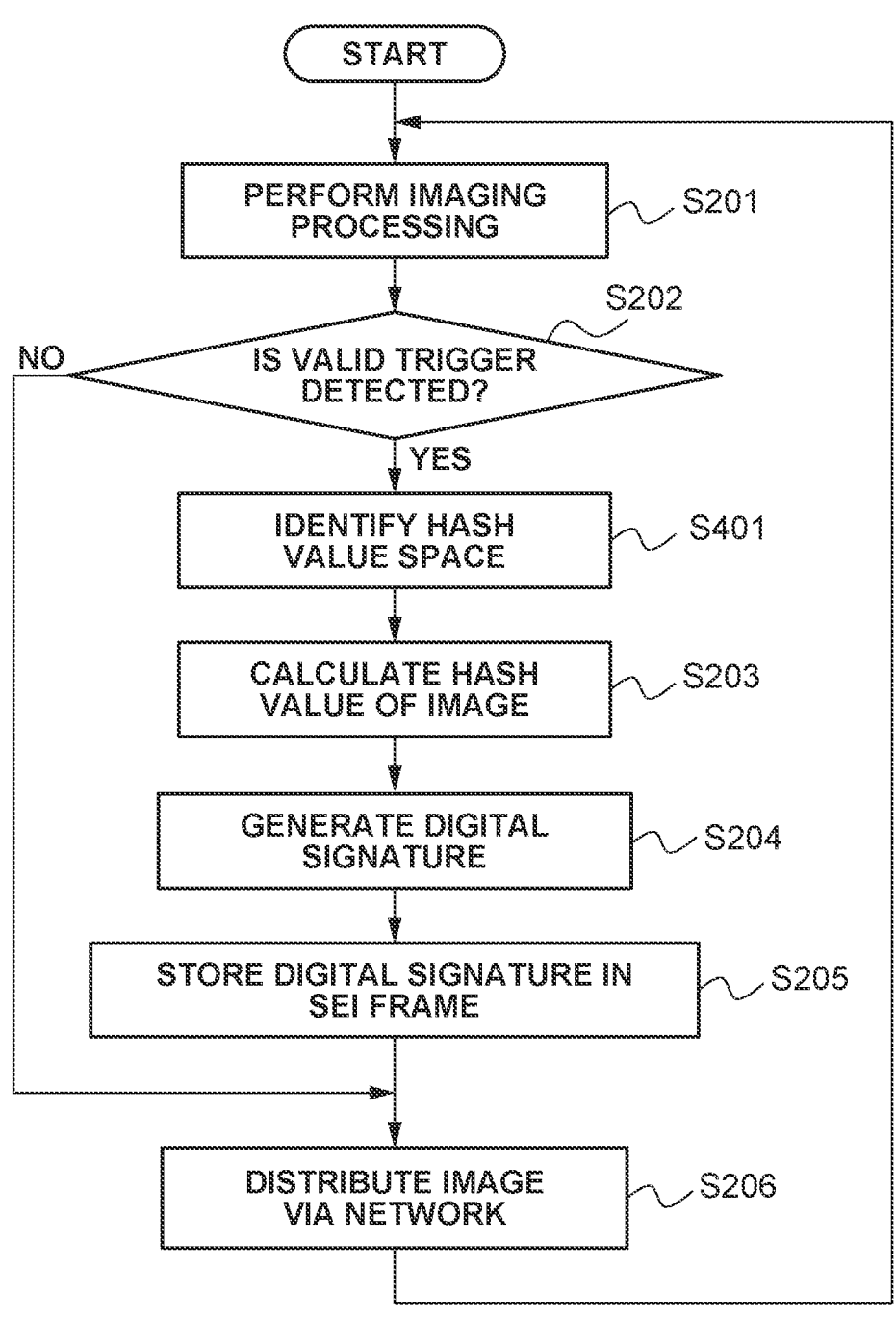
FIG. 4 is a flowchart illustrating a camera control method.

FIG. 4 is a flowchart illustrating a method for controlling the camera 100 according to a second exemplary embodiment.

FIG. 4 illustrates details of a process in which in a case where a specific trigger occurs, a digital signature for use to detect that editing or tampering has been conducted is generated in the camera 100 for a portion of a captured image where the trigger has been detected. The second exemplary embodiment will be described below with reference to FIG. 4.

FIG. 4 includes step S401 in addition to FIG. 2. Differences of FIG. 4 from FIG. 2 will be described below.

Step S201 corresponds to step S201 in FIG. 2. In step S202, in a case where a valid trigger is detected by the trigger detection unit 123 (YES in step S202), the processing proceeds to step S401, whereas in a case where no valid trigger is detected by the trigger detection unit 123 (NO in step S202), the processing proceeds to step S206.

In step S206, in a case where the camera 100 is a network camera, the CPU 121 distributes the captured image transferred to the memory 122 to the information processing apparatus 140 via the network I/F 125 and the network device 130. Thereafter, the processing returns to step S201, and the CPU 121 repeats the process on the next frame.

In step S401, the CPU 121 identifies a hash value space for the hash value calculation in the captured image. A specific example of a hash value space will be described below. In a case where the camera 100 is a network camera used for monitoring and a motion is detected by the trigger detection unit 123, the CPU 121 identifies a portion including the detected motion as a hash value space. Thereafter, the processing proceeds to step S203.

In step S203, the CPU 121 performs hash value calculation for the hash value space identified in step S401 in the captured image. The hash value calculation may be performed, for example, for each GOP or each frame.

Steps S204 and S205 correspond to steps S204 and S205 in FIG. 2. In step S206 following step S205, in a case where the camera 100 is a network camera, the CPU 121 distributes the captured image for which the digital signature is stored in the SEI frame to the information processing apparatus 140 via the network I/F 125 and the network device 130. Thereafter, the processing returns to step S201, and the CPU 121 repeats the process on the next frame.

As described above, in steps S203 and S204, the CPU 121 calculates a hash value and generates a digital signature for a portion in the frame. Specifically, the CPU 121 calculates a hash value and generates a digital signature for the portion where the detection in step S202 occurs. The detection in step S202 is, for example, a detection of a motion. The CPU 121 calculates a hash value and generates a digital signature for the portion including the detected motion.

As described above, according to the present exemplary embodiment, in a case where a motion is detected by a network camera used for monitoring, the camera 100 provides evidentiality to a portion including the motion that is considered important. This makes it possible to reduce processing loads of the camera 100 compared to a case where evidentiality is provided to the entire captured image.

Figure 5:
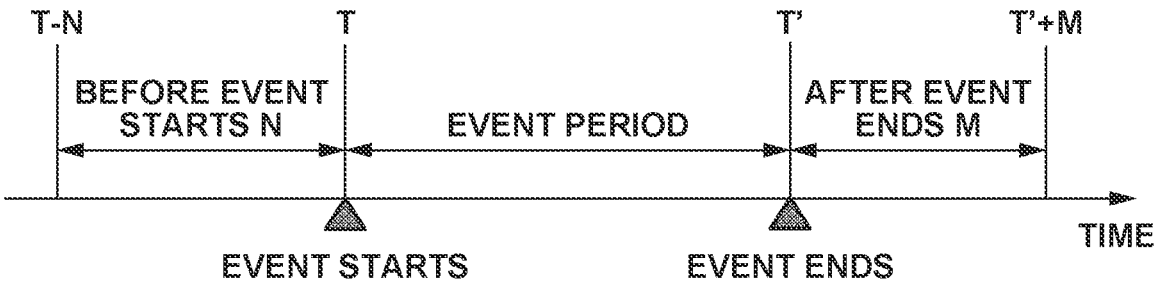
FIG. 5 is a diagram illustrating times preceding and following a period during which an event occurs.

FIG. 5 is a time chart illustrating a method for controlling the camera 100 according to a third exemplary embodiment.

FIG. 5 is a diagram for illustrating that a digital signature for use to detect that a captured image has been edited or tampered with is generated for a period preceding an occurrence of an event (detection). The third exemplary embodiment will be described below with reference to FIG. 5.

In FIG. 5, a horizontal axis represents time. Times preceding and following an occurrence of an event that is a trigger for providing the functionality of detecting that a captured image has been edited or tampered with will be described below with reference to FIG. 5.

For example, in a case where the camera 100 is a network camera that images a space normally without a person as illustrated in FIG. 3 and a motion is detected by the trigger detection unit 123, the CPU 121 determines that this is an emergency and an occurrence of an event of a valid trigger is at time T. The trigger detection unit 123 detects a start of the event at time T and detects an end of the event at time T'.

In this case, the valid trigger event period is from time T to time T'. The CPU 121 determines the period from time T to time T' as a period of an emergency, and in order to provide the functionality of detecting that the captured image has been edited or tampered with, the CPU 121 generates a digital signature as in the first or second exemplary embodiment.

Furthermore, in order to provide the functionality of detecting that the captured image has been edited or tampered with also to the period from time T' at the end of the event to time T'+M, the CPU 121 performs steps S401 and steps S203 to S205 and generates a digital signature. Time T'+M is the time for which the time M has elapsed since the end of the event at time T'. Step S401 may be skipped.

Furthermore, since the memory 122 stores the captured image of frames of a predetermined preceding period based on the memory capacity of the memory 122, the CPU 121 provides the functionality of detecting that the captured image has been edited or tampered with also to the period from the start of the event at time T to time T–N, which is time N before time T. Specifically, in order to provide the functionality of detecting that the captured image has been edited or tampered with also to the period from time T–N to time T, the CPU 121 performs steps S401 and steps S203 to S205 and generates a digital signature. Time T–N is time N before the start of the event at time T. Step S401 may be skipped.

As described above, the CPU 121 generates a digital signature for not only the captured image of frames corresponding to the event period from time T to time T' but also the captured image of frames corresponding to the period from time T' to time T'+M after the event ends and the captured image of frames corresponding to the period from time T–N to time T before the event starts, thereby providing the functionality of detecting that editing or tampering has been conducted.

The CPU 121 generates a digital signature for each frame or GOP corresponding to the period from time T to time T' during which the detection in step S202 occurs, the period from time T' to time T'+M following the period from time T to time T', and the period from time T–N to time T preceding the period from time T to time T'.

Periods for which a digital signature is to be generated are not limited to the above-described periods. The CPU 121 may generate a digital signature for each frame or GOP corresponding to the period from time T to time T' during which the detection in step S202 occurs.

Further, the CPU 121 may generate a digital signature for each frame or GOP corresponding to the period from time T to time T' during which the detection in step S202 occurs and the period from time T' to time T'+M following the period from time T to time T'.

Further, the CPU 121 may generate a digital signature for each frame or GOP corresponding to the period from time T to time T' during which the detection in step S202 occurs and the period from time T–N to time T preceding the period from time T to time T'.

As described above, according to the present exemplary embodiment, in a case where a valid trigger that necessitates evidentiality of a video that is a captured image occurs, the camera 100 generates a digital signature also for frames preceding and following the event. This makes it possible to reduce processing loads of the camera 100 compared to a case where the camera 100 generates a digital signature for every frame of the video.

According to the first to third exemplary embodiments, the camera 100 generates a digital signature in a case where a valid trigger that necessitates evidentiality of a video that is a captured image occurs. This makes it possible to reduce processing loads of the camera 100 compared to a case where the camera 100 generates a digital signature for every frame of the video.

The camera 100 is an example of an imaging apparatus. The imaging apparatus is applicable to not only digital cameras and video cameras but also smartphones, tablets, industrial cameras, medical cameras, and on-vehicle cameras.

Other Exemplary Embodiments

The present disclosure can also be realized by a process in which a program for realizing one or more functions of the above-described exemplary embodiments is supplied to a system or an apparatus via a network or a storage medium and one or more processors of a computer of the system or the apparatus read the program and execute the read program. Further, the present disclosure can also be realized by a circuit (e.g., application-specific integrated circuit (ASIC)) that realizes the one or more functions.

While Exemplary embodiments have been described, the present disclosure is not limited to the exemplary embodiments, and various modifications and changes are possible within the spirit of the disclosure.

The disclosure of the exemplary embodiments includes the following configurations, methods, and programs.
(Configuration 1)

An imaging apparatus including an acquisition unit configured to acquire a video captured by an imaging unit frame by frame and a generation unit configured to generate a digital signature for a frame of the video and generate no digital signature for another frame of the video in a case where a predetermined detection related to the imaging apparatus or the video occurs.

9 10

(Configuration 2)

The imaging apparatus according to configuration 1, further including a calculation unit configured to calculate a hash value for a frame of the video and calculate no hash value for another frame of the video, wherein the generation unit generates a digital signature based on the hash value calculated by the calculation unit.

(Configuration 3)

The imaging apparatus according to configuration 2, wherein the generation unit generates a digital signature by encrypting the hash value calculated by the calculation unit.

(Configuration 4)

The imaging apparatus according to any one of configurations 1 to 3, further including a determination unit configured to determine, for each frame of the video, whether the predetermined detection occurs, wherein the generation unit generates a digital signature for each frame or GOP corresponding to the frame where the predetermined detection occurs.

(Configuration 5)

The imaging apparatus according to configuration 4, wherein the generation unit generates a digital signature for each frame or GOP corresponding to a period during which the predetermined detection occurs.

(Configuration 6)

The imaging apparatus according to configuration 4, wherein the generation unit generates a digital signature for each frame or GOP corresponding to a first period during which the predetermined detection occurs and a second period following the first period.

(Configuration 7)

The imaging apparatus according to configuration 4, wherein the generation unit generates a digital signature for each frame or GOP corresponding to a first period during which the predetermined detection occurs and a third period preceding the first period.

(Configuration 8)

The imaging apparatus according to configuration 4, wherein the generation unit generates a digital signature for each frame or GOP corresponding to a first period during which the predetermined detection occurs, a second period following the first period, and a third period preceding the first period.

(Configuration 9)

The imaging apparatus according to any one of configurations 4 to 8, wherein the predetermined detection is a detection of a motion.

(Configuration 10)

The imaging apparatus according to any one of configurations 4 to 8, wherein the predetermined detection is a detection of a specific individual.

(Configuration 11)

The imaging apparatus according to any one of configurations 4 to 8, wherein the predetermined detection is a detection of a specific object.

(Configuration 12)

The imaging apparatus according to any one of configurations 4 to 8, wherein the predetermined detection is a detection of an acceleration equal to or above a threshold.

(Configuration 13)

The imaging apparatus according to any one of configurations 4 to 8, wherein the predetermined detection is a detection of a specific sound.

(Configuration 14)

The imaging apparatus according to any one of configurations 1 to 13, wherein the generation unit generates the digital signature for a portion in the frame.

(Configuration 15)

The imaging apparatus according to any one of configurations 4 to 8, wherein the generation unit generates the digital signature for a portion where the predetermined detection occurs.

(Configuration 16)

The imaging apparatus according to configuration 15, wherein the predetermined detection is a detection of a motion and wherein the generation unit generates the digital signature for a portion including the detected motion.

(Method 1)

A method for controlling an imaging apparatus, the method including acquiring a video captured by the imaging apparatus frame by frame and generating a digital signature for a frame of the video and generating no digital signature for another frame of the video in a case where a predetermined detection related to the imaging apparatus or the video occurs.

(Program 1)

A program for causing a computer to execute the method including acquiring a video captured by an imaging apparatus frame by frame and generating a digital signature for a frame of the video and generating no digital signature for another frame of the video in a case where a predetermined detection related to the imaging apparatus or the video occurs.

The present disclosure makes it possible to reduce processing loads in generating a digital signature.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-069115, filed Apr. 20, 2023, which is hereby incorporated by reference herein in its entirety.

What is claimed is:

1. An imaging apparatus comprising:
one or more processors; and
a non-transitory memory storing instructions that, when executed by the one or more processors, cause the one or more processors to function as:
an acquisition unit configured to acquire a video captured by an imaging unit frame by frame;
   a determination unit configured to determine for each frame of the video whether a predetermined event occurs to indicate a valid trigger,
   a generation unit, based on the valid trigger, configured to generate a digital signature for each frame or group of pictures (GOP) corresponding to: a first period during which the predetermined event occurs, a second period following the first period of the predetermined event, and a third period preceding the first period of the predetermined event, such that, a first digital signature is generated for the first period during which the predetermined event occurs, a second digital signature is generated for the second period following the first period of the predetermined event, and a third digital signature is generated for the third period preceding the first period of the predetermined event, and ending the generation of the digital signature for each frame or GOP in a case where the predetermined event is determined as being ended.

2. The imaging apparatus according to claim 1, wherein the instructions further cause the one or more processors to function as a calculation unit configured to calculate a hash value for the frame of the video where the predetermined event occurs, and
   wherein the generation unit generates the digital signature based on the hash value calculated by the calculation unit.

3. The imaging apparatus according to claim 2, wherein the generation unit generates the digital signature by encrypting the hash value calculated by the calculation unit.

4. The imaging apparatus according to claim 1, wherein the predetermined event is a detection of a motion.

5. The imaging apparatus according to claim 1, wherein the predetermined event is a detection of a specific individual.

6. The imaging apparatus according to claim 1, wherein the predetermined event is a detection of a specific object.

7. The imaging apparatus according to claim 1, wherein the predetermined event is a detection of an acceleration equal to or above a threshold.

8. The imaging apparatus according to claim 1, wherein the predetermined event is a detection of a specific sound.

9. The imaging apparatus according to claim 1, wherein the generation unit generates the digital signature for a portion in the frame.

10. The imaging apparatus according to claim 1, wherein the generation unit generates the digital signature for a portion where the predetermined event occurs.

11. The imaging apparatus according to claim 1,
wherein the predetermined event is a detection of a motion, and
wherein the generation unit generates the digital signature for a portion including the detected motion.

12. The imaging apparatus according to claim 1, wherein in a case where the predetermined event is determined as being ended, after an elapse of a predetermined period, the generation unit ends the generation of the digital signature for the frame of the video.

13. A method for controlling an imaging apparatus, the method comprising:
acquiring a video captured by the imaging apparatus frame by frame;
determining for each frame of the video whether a predetermined event occurs to indicate a valid trigger;
generating, based on the valid trigger, a digital signature for each frame or group of pictures (GOP) corresponding to: a first period during which the predetermined event occurs, a second period following the first period of the predetermined event, and a third period preceding the first period of the predetermined event, such that, a first digital signature is generated for the first period during which the predetermined event occurs, a second digital signature is generated for the second period following the first period of the predetermined event, and a third digital signature is generated for the third period preceding the first period of the predetermined event; and
ending the generation of the digital signature for each frame or GOP in a case where the predetermined event is determined as being ended.

14. A non-transitory computer-readable storage medium storing a program for causing a computer to execute a control method comprising:
acquiring a video captured by the imaging apparatus frame by frame;
determining for each frame of the video whether a predetermined event occurs to indicate a valid trigger;
generating, based on the valid trigger, a digital signature for each frame or group of pictures (GOP) corresponding to: a first period during which the predetermined event occurs, a second period following the first period of the predetermined event, and a third period preceding the first period of the predetermined event, such that, a first digital signature is generated for the first period during which the predetermined event occurs, a second digital signature is generated for the second period following the first period of the predetermined event, and a third digital signature is generated for the third period preceding the first period of the predetermined event; and
ending the generation of the digital signature for each frame or GOP in a case where the predetermined event is determined as being ended.

* * * * *